US012412501B2

(12) United States Patent
Yoo

(10) Patent No.: US 12,412,501 B2
(45) Date of Patent: Sep. 9, 2025

(54) DISPLAY DEVICE AND METHOD OF DRIVING THE SAME

(71) Applicant: Samsung Display Co., Ltd., Yongin-Si (KR)

(72) Inventor: Gi Na Yoo, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/640,283

(22) Filed: Apr. 19, 2024

(65) Prior Publication Data

US 2025/0140150 A1 May 1, 2025

(30) Foreign Application Priority Data

Oct. 27, 2023 (KR) ........................ 10-2023-0145270

(51) Int. Cl.
*G09G 3/20* (2006.01)

(52) U.S. Cl.
CPC ... *G09G 3/2003* (2013.01); *G09G 2320/0233* (2013.01); *G09G 2320/0257* (2013.01); *G09G 2320/043* (2013.01)

(58) Field of Classification Search
CPC ......... G09G 3/2003; G09G 2320/0233; G09G 2320/0257; G09G 2320/043
See application file for complete search history.

(56) References Cited

U.S. PATENT DOCUMENTS

| | | | | |
|---|---|---|---|---|
| 9,997,104 | B2 | 6/2018 | Zhang et al. | |
| 11,636,812 | B2 | 4/2023 | Kim et al. | |
| 2017/0069273 | A1* | 3/2017 | Park | G09G 3/3233 |
| 2017/0076661 | A1* | 3/2017 | Zhang | G09G 3/2003 |
| 2019/0333452 | A1* | 10/2019 | Kim | G09G 3/2003 |
| 2021/0013298 | A1* | 1/2021 | Her | G09G 3/3233 |
| 2024/0331613 | A1* | 10/2024 | Kim | G09G 3/32 |

FOREIGN PATENT DOCUMENTS

KR 10-2502205 B1 2/2023

* cited by examiner

*Primary Examiner* — Kenneth Bukowski
(74) *Attorney, Agent, or Firm* — Innovation Counsel LLP

(57) ABSTRACT

A display device includes: a pixels unit including first pixels in a first pixel area and second pixels in a second pixel area; a degradation compensator for generating a stress compensation weighted value by accumulating image data, generating first compensation data corresponding to the first pixels, based on the stress compensation weighted value and a first compensation factor, and generating second compensation data, based on the stress compensation weighted value and a second compensation factor; and a panel driver for driving the pixel unit by reflecting the first compensation data and the second compensation data on input data from an outside.

20 Claims, 15 Drawing Sheets

PX: PX1, PX2

PX2: SP1a, SP2a, SP3a

PX1: SP1b, SP2b, SP3b

CFb: CF1b, CF2b, CF3b
PX1: SP1b, SP2b, SP3b

DISPLAY DEVICE AND METHOD OF DRIVING THE SAME

CROSS-REFERENCE TO RELATED APPLICATION

The present application claims priority under 35 U.S.C. § 119 (a) to Korean patent application No. 10-2023-0145270, filed on Oct. 27, 2023 in the Korean Intellectual Property Office, the entire disclosure of which is incorporated herein by reference.

BACKGROUND

Technical Field

The present disclosure generally relates to a display device and a method of driving the same.

Related Art

A display device may display an image, using an array of pixels in which each pixel includes a pixel circuit. A display device may further include a sensor, a camera, and the like at a bezel (or an edge portion) of a front surface of the display device (e.g., one surface on which the image is displayed). For example, the display device may recognize objects using an optical sensor and may acquire photographs or moving images using a camera.

A camera or the like in a display device may overlap or be within the pixel area of the display device so that a bezel area may be minimized. In order to improve the transmittance of an area in which the camera is disposed, a display resolution of in the area of the camera may be lower than a display resolution in another area of the display device.

In a display device (particularly, an organic light emitting display device), a luminance deviation between pixels and an afterimage may result from degradation of a pixel or a light emitting element. Therefore, compensation of image data may be performed to improve display quality. When the same compensation method is used in areas having different resolutions, the degradation of the pixel (or the light emitting element) may not be stably compensated.

SUMMARY

Embodiments disclosed herein may provide a display device and a method of driving the same, in which compensation for degradation can use a first compensation factor in a first pixel area having a low resolution and use a second compensation factor in a second pixel area having a high resolution.

In accordance with an aspect of the present disclosure, a display device may include: a pixels unit including first pixels disposed in a first pixel area and second pixels disposed in a second pixel area; a degradation compensator configured to generate a stress compensation weighted value by accumulating image data, generate first compensation data corresponding to the first pixels, based on the stress compensation weighted value and a first compensation factor, and generate second compensation data, based on the stress compensation weighted value and a second compensation factor; and a panel driver configured to drive the pixel unit by reflecting the first compensation data and the second compensation data on input data from an outside.

A number of the first pixels per unit area may be smaller than a number of the second pixels disposed per unit area.

The first compensation factor may include an opening ratio of first pixels and a color filter thickness of the first pixel area.

The color filter thickness may be commonly applied to the first pixels.

Each of the first pixels may include a first sub-pixel and a second sub-pixel displaying a color different from a color of the first sub-pixel, and different color filter thicknesses may be applied to the first sub-pixel and the second sub-pixel.

A driving current of the first pixel, which corresponds to the first compensation data, may be greater than a driving current before the color filter thickness is reflected on the first compensation data.

When the opening ratio of the first pixels is greater than a predetermined reference opening ratio, a driving current of the first pixel, which corresponds to the first compensation data, may be greater than a driving current before the opening ratio is reflected on the first compensation data.

When the opening ratio of the first pixels is smaller than a predetermined reference opening ratio, a driving current of the first pixel, which corresponds to the first compensation data, may be smaller than a driving current before the opening ratio is reflected on the first compensation data.

The second compensation factor may include an opening ratio of second pixels.

When the opening ratio of the second pixels is greater than a predetermined reference opening ratio, a driving current of the second pixel, which corresponds to the second compensation data, may be greater than a driving current before the opening ratio is reflected on the second compensation data.

When the opening ratio of the second pixels is smaller than a predetermined reference opening ratio, a driving current of the second pixel, which corresponds to the second compensation data, may be smaller than a driving current before the opening ratio is reflected on the second compensation data.

The panel driver may include: a timing controller configured to generate output data to be supplied to the first pixels by reflecting the first compensation data on input data to be supplied to the first pixels among the input data, and generate output data to be supplied to the second pixels by reflecting the second compensation data on input data to be supplied to the second pixels among the input data; and a data driver configured to generate a data signal to be supplied to the first pixels and the second pixels, using the output data.

The image data may be at least one of the input data and the output data.

The degradation compensator may include: a compensation factor determiner configured to determine an opening ratio compensation factor, based on the opening ratio of the first pixel and the opening ratio of the second pixel, and determine a color filter compensation factor, based on the color filter thickness of the first pixel area; and a data compensator configured to generate the first compensation data and the second compensation data, using the opening ratio compensation factor, the color filter compensation factor, and the stress compensation weighted value.

The degradation compensator may further include: a stress converter configured to generate the stress compensation weighted value; and a memory configured to store the opening ratio of the first pixel, the opening ratio of the second pixel, and the color filter thickness of the first pixel area.

In accordance with another aspect of the present disclosure, there is provided a method of driving a display device, the method including: generating a stress compensation weighted value by accumulating image data, and generating first compensation data that depends on the stress compensation weighted value, an opening ratio of first pixels having a first resolution and a color filter thickness of the first pixels; generating second compensation data that depends on the stress compensation weighted value and an opening ratio of second pixels having a second resolution; generating output data by altering, based on the first compensation data, first input data corresponding to the first pixel among input data supplied from an outside; and generating output data by altering, based on the second compensation data, second input data corresponding to the second pixel among the input data.

A number of the first pixels disposed per unit area may be smaller than a number of the second pixels disposed per unit area.

The color filter thickness may be commonly applied to the first pixels.

Each of the first pixels may include a first sub-pixel and a second sub-pixel displaying a color different from a color of the first sub-pixel, and different color filter thicknesses may be applied to the first sub-pixel and the second sub-pixel.

The opening ratio of the first pixels, the opening ratio of the second pixels, and the color filter thickness of the first pixels may be measured and stored in advance in a process manufacturing the display device.

DETAILED DESCRIPTION

Figure 1:
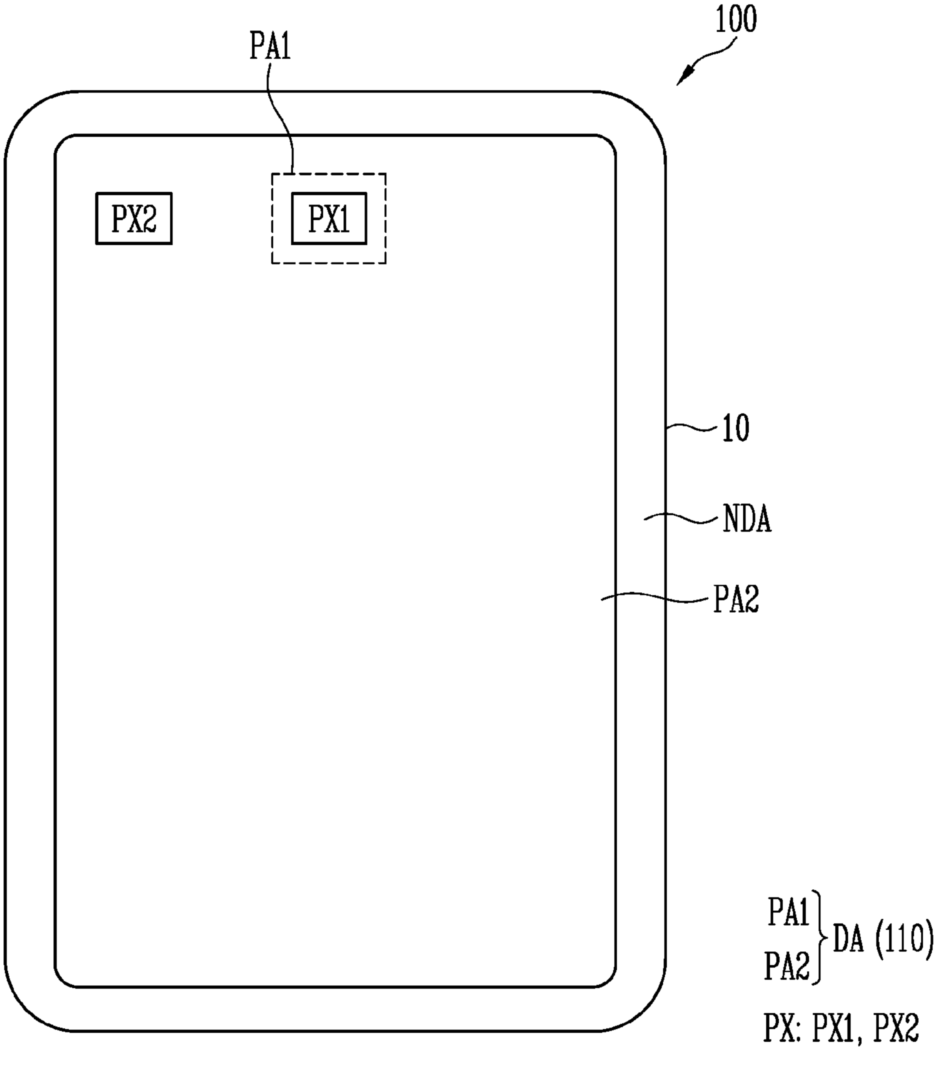
FIG. 1 shows a display panel in accordance with an embodiment of the present disclosure.

Example embodiments are described hereinafter with reference to the accompanying drawings; however, embodiments in accordance with this disclosure may take different forms and should not be construed as being limited to the example embodiments. Rather, the example embodiments are provided so that this disclosure will be thorough and complete and will fully convey the scope of the disclosure to those skilled in the art. In particular, the present disclosure may be implemented in various different forms and is not limited to the example embodiments described in the present specification.

Description of parts that are irrelevant or unimportant to the description may be omitted in the following to clearly describe the present disclosure.

The constituent elements that are the same or similar may be designated by the same reference numerals in the drawings and throughout the specification. Therefore, the same reference numerals may be used in different drawings to identify the same or similar elements.

The size and thickness of each component illustrated in the drawings may be arbitrarily shown for better understanding and ease of description, but the present disclosure is not limited to the dimensions or proportions shown in the drawings. The dimensions or thicknesses of several portions and regions may be exaggerated for clear illustration or description.

An element referred to herein as being "between" two elements may be the only element between the two elements or one or more intervening elements may also be present between the two elements.

In description, the expression "equal" as used herein may mean "substantially equal." That is, equal may indicate equality to a degree to which those skilled in the art understand the equality. Other expressions may be expressions in which "substantially' is omitted but implied.

Some embodiments are described and shown in the accompanying drawings in relation to functional blocks, units, and/or modules. Those skilled in the art will understand that these blocks, units, and/or modules may be physically implemented by logic circuits, individual components, microprocessors, hard wire circuits, memory elements, line connections, and other electronic circuits, any of which may be formed using semiconductor-based manufacturing techniques or other manufacturing techniques. In the case of blocks, units, and/or modules implemented by microprocessors or other similar hardware, the units, and/or modules may be programmed and controlled using software, firmware, or the like that when executed performs various functions discussed in the present disclosure. In addition, each block, each unit, and/or each module may be implemented by dedicated hardware or by a combination dedicated hardware to perform some functions of the block, the unit, and/or the module and a processor (e.g., one or more programmed microprocessors and associated circuitry) to perform other functions of the block, the unit, and/or the module. In some embodiments, a block, unit, and/or module may be physically separated into two or more individual blocks, two or more individual units, and/or two or more individual modules without departing from the scope of the present disclosure. Also, in some embodiments, the blocks, the units, and/or the modules may be combined into more complex blocks, more complex units, and/or more complex modules without departing from the scope of the present disclosure.

The term "connection" between two components may include both electrical connection and physical connection, but the present disclosure is not necessarily limited thereto. For example, the term "connection" used when referring to circuit diagrams may mean electrical connection, and the term "connection" used when referring to sectional and plan views may mean physical connection.

The terms "first," "second," etc. may be used herein to describe various elements, but these elements should not be limited by these terms. These terms are only used to distinguish one element from another element. Thus, a "first" element described herein could also be termed a "second" element without departing from the teachings of the present disclosure.

The present disclosure is not limited to embodiments disclosed below and may be implemented in various forms. Each embodiment disclosed below may be independent or may be combined with one or more other embodiments.

Figure 2:
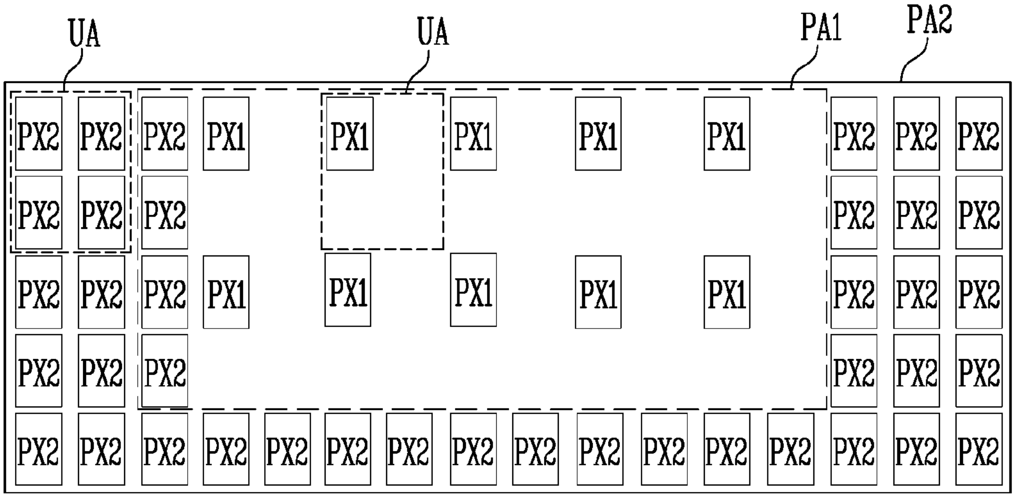
FIG. 2 shows an embodiment of a portion of a pixel unit of the display device shown in FIG. 1.

FIG. 1 shows a display device in accordance with an embodiment of the present disclosure. FIG. 2 shows an embodiment of a portion of a pixel unit of the display device shown in FIG. 1.

Referring to FIGS. 1 and 2, a display device 100 may include a display panel 10 including a pixel unit 110.

The display panel 10 may include a display area DA and a non-display area NDA. Pixels PX may be disposed in the display area DA, and various types of drivers for driving the pixels PX may be disposed in the non-display area NDA.

The display area DA may correspond to the pixel unit 110 including a plurality of pixels PX. The pixel unit 110 may include a first pixel area PA1 and a second pixel area PA2. First pixels PX1 may be disposed in the first pixel area PA1, and second pixels PX2 may be disposed in the second pixel area PA2.

In an embodiment, a size (e.g., a ratio of a channel width and a channel length, or the like) of a driving transistor included in the first pixel PX1 may be different from a size (e.g., a ratio of a channel width and a channel length, or the like) of a driving transistor included in the second pixel PX2.

In an embodiment, a number (density) of first pixels PX1 disposed in a unit area UA may be smaller than a number (density) of second pixels PX2 disposed in the unit area UA as shown in FIG. 2. For example, one first pixel PX1 may be disposed in the unit area UA, and four second pixels PX2 may be disposed in the unit area UA. Therefore, a resolution of an image portion displayed in the first pixel area PA1 may be lower than a resolution of an image portion displayed in the second pixel area PA2.

Since the resolution of the first pixel area PA1 is lower than the resolution of the second pixel area PA2, a device such as a camera, an optical sensor, and the like may be disposed to overlap with the first pixel area PA1 without causing unacceptable interference between the device and the first pixels PX1 in the first pixel area PA1. The overlapping device may, for example, be an optical sensor, which may include biometric information sensors such as a fingerprint sensor, an iris recognition sensor, and an arterial sensor. However, this is merely illustrative, and an optical sensing type optical sensor may include a gesture sensor, a motion sensor, a proximity sensor, an illumination sensor, an image sensor, and the like.

Figure 3:
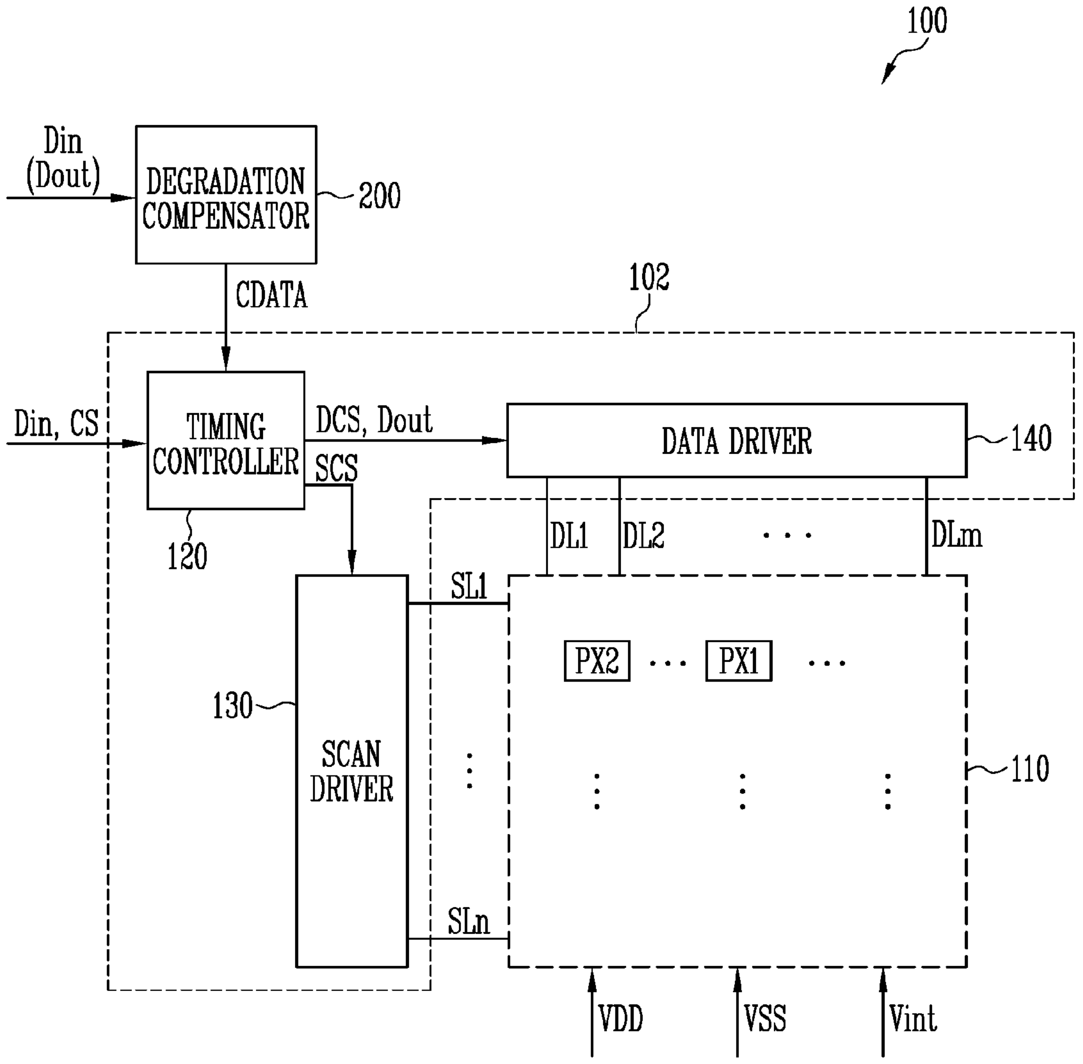
FIG. 3 is a block diagram illustrating a display device in accordance with embodiments of the present disclosure.
Figure 4:
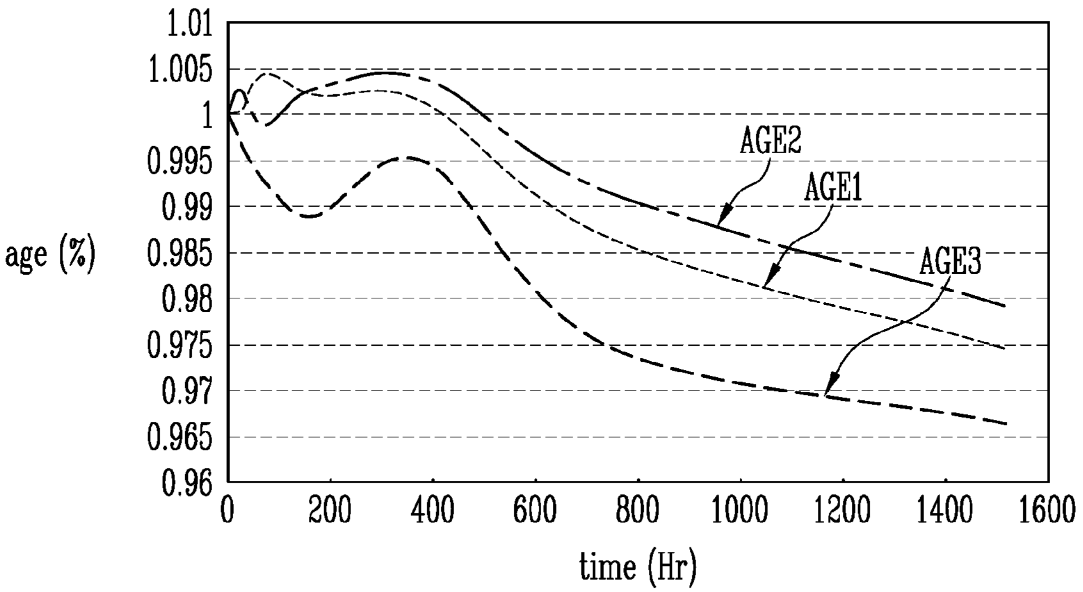
FIG. 4 is a graph schematically illustrating an example of an age distribution of a pixel, which is caused by a difference in opening ratio between pixels.

FIG. 3 is a block diagram illustrating a display device in accordance with embodiments of the present disclosure. FIG. 4 is a graph schematically illustrating an example of an age distribution of a pixel, which is caused by a difference in opening ratio between pixels.

The display device 100 in accordance with the embodiment of FIG. 3 may include a pixel unit 110 (or display panel), a panel driver 102, and a degradation compensator 200.

The display device 100 may be applied to electronic devices such as a computer, a notebook computer (laptop), a cellular phone, a smart phone, a Personal Digital Assistant (PDA), a Portable Multimedia Player (PMP), a digital TV, a digital camera, a portable game console, a navigation device, a wearable device, an Internet of Things (IoT) device, an Internet of Everything (IoE) device, an electronic-book (e-book), a virtual reality (VR) device, an augmented reality (AR) device, a vehicle navigation system, a video phone, an observation system, an auto-focus system, a tracking system, and a movement sensing system.

The pixel unit 110 may include pixels PX formed in areas associated with intersections of scan lines SL1 to SLn and data lines DL1, DL2, . . . , and DLm (each of n and m being a natural number of 2 or more). Each of the pixels PX may include a driving transistor and a light emitting element.

In an embodiment, the pixel unit 110 may include the first pixel area PA1 and the second pixel area PA2, which are described with reference to FIGS. 1 and 2. First pixels PX1 may be included in the first pixel area PA1, and second pixels PX2 may be included in the second pixel area PA2. The first pixels PX1 and the second pixels PX2 may have the same structure or different structures.

In an embodiment, each of the pixels PX may include a plurality of sub-pixels. Each of the sub-pixels may emit light of one color among red, green, and blue. However, this is merely illustrative, and each of the sub-pixels may emit light of one color among cyan, magenta, yellow, and the like.

The degradation compensator 200 may generate a stress compensation weighted value by accumulating input data Din (and/or output data Dout), and the degradation compensator 200 may output compensation data CDATA, which may be based on the stress compensation weighted value and a compensation factor. The degradation compensator 200 may generate compensation data CDATA using a first compensation factor corresponding to the first pixels PX1 and using a second compensation factor corresponding to the second pixels PX2.

In an embodiment, the first compensation factor may depend on a thickness of a color filter of the first pixels PX1 located in the first pixel area PA1 and an opening ratio of each of the first pixels PX1. The second compensation factor may depend on an opening ratio of each of the second pixels PX2 located in the second pixel area PA2. In an example, the opening ratio of each of the first pixels PX1 and the second pixels PX2 may be measured (or photographed) during a processing or manufacturing process. In an example, the opening ratio of each of the first pixels PX1 and the second pixels PX2 may be calculated by measuring a distance between sub-pixels.

In an example, the thickness of the color filter located in the first pixel area PA1 may be measured during the processing or manufacturing process. In an embodiment, the degradation compensator 200 may include a compensation factor determiner for applying a compensation factor corresponding to each of the first and second pixels PX1 and PX2 and a data compensator for generating compensation data CDATA for compensating for the input data Din by applying the compensation factor (or the first compensation factor or the second compensation factor) to the stress compensation weighted value.

In an embodiment, compensation data CDATA corresponding to each of the first pixels PX1 may include a compensation factor for compensating for a stress compensation weighted value, an opening ratio difference, and a thickness of the color filter. Compensation data CDATA corresponding to each of the second pixels PX2 may include a compensation factor for compensating for a stress compensation weighted value and an opening ratio difference. In an embodiment, the degradation compensator 200 may calculate a stress value from accumulated image data Din (and/or Dout) and may generate a stress compensation weighted value corresponding to the stress value. The stress value may depend on an emission time, a grayscale (or luminance), and the like.

The stress value may be a value calculated by synthesizing all image data of the all the pixels, and be generated by using, as a unit, a pixel block including an individual pixel or grouped pixels. That is, the stress value may be equally applied to all the pixels or may be independently calculated for every individual pixel or every group of pixels in a partition of all the pixels.

In an embodiment, the degradation compensator 200 may be implemented as a separate Application Processor (AP). In another embodiment, at least a portion or the whole of the degradation compensator 200 may be included in a timing controller 120. In still another embodiment, the degradation compensator 200 may be included in an Integrated Circuit (IC) including a data driver 140.

In an embodiment, the panel driver 102 may include the timing controller 120, a scan driver 130, and the data driver 140.

The scan driver 130 may provide a scan signal through the scan lines SL1 to SLn to the pixels PX of the pixel unit 110. The scan driver 130 may provide the scan signal to the scan lines SL1 to SLn, based on a scan control signal SCS received from the timing controller 120.

The data driver 140 may provide a data signal to which compensation data CDATA is applied, the data signal being provided to the pixels PX through the data lines DL1 to DLm. The data driver 140 may provide the data signal (or data voltages) to the pixel unit 110, based on a data driving control signal DCS received from the timing controller 120. In an embodiment, the data driver 140 may convert output data to which the compensation data CDATA is applied into a data signal in an analog form, e.g. into an analog data voltage for controlling the intensity of light emitted from a target pixel.

In an embodiment, the data driver 140 may convert the output data signal Dout to a voltage of a data signal on a targeted one of data lines DL1 to DLm, and the conversion may depend on an opening ratio of a target pixel PX, based on the compensation data CDATA. For example, when the opening ratio is greater than a predetermined opening ratio, a magnitude of an absolute value of a compensated data voltage may be greater than a value of an absolute value of a data voltage before compensation based on the opening ratio. When the opening ratio is smaller than the predetermined opening ratio, a magnitude of an absolute value of a compensated data voltage may be smaller than a value of an absolute value of a data voltage before compensation based on the opening ratio. The opening ratio may have different values for the first pixels PX1 and the second pixels PX2. A data voltage being high may mean that a relatively large amount of driving current flows in the target pixel for the same grayscale illumination.

In an embodiment, the thickness of the color filter of the first pixel area PA1 is thin compared with the thickness of a color filter of the second pixel area PA2, and a magnitude of an absolute value of a data voltage after compensation corresponding to the thickness of the color filter may be greater than a magnitude of an absolute value of a data voltage before compensation, or before compensation that does not account for the thickness of the color filter. The thickness of the color filter may be reflected on the first pixels PX1.

The timing controller 120 may receive input data Din and a control signal CS, which an external graphic source or the like may provide, and the timing controller 120 may control driving of the scan driver 130 and the data driver 140. The timing controller 120 may generate the scan control signal SCS and the data driving control signal DCS. In an embodiment, the timing controller 120 may generate output data Dout by applying compensation data CDATA to the input data Din. The output data Dout may be provided to the data driver 140.

In an embodiment, the timing controller 120 may further control the degradation compensator 200. For example, the timing controller 120 may provide to the degradation compensator 200 output data Dout of each frame that the pixel unit 110 displays. The degradation compensator 200 may accumulate the output data Dout and store accumulated values.

In an embodiment, the panel driver 102 may further include a power supply (not shown) for generating a first driving power source VDD, a second driving power source VSS, and an initialization power source Vint, which are used for driving of the pixel unit 110.

FIG. 4 illustrates a distribution of an age curve of the pixel PX (or the pixel unit 110) according to an opening ratio of the pixel PX. The light emitting element included in the pixel PX may have a characteristic in which the luminance of the light emitting element decreases as time elapses due to degradation of a material in the light emitting element. The age of the pixel PX decreases according to a decrease in luminance.

In an embodiment, a difference in opening ratio may occur for each pixel unit 110 (or display panel) or each pixel PX due variations in a process of forming the pixel PX. The opening ratio of the pixel PX may be an area ratio of an emission area defined by a pixel defining layer to a reference area. The emission area may correspond to the area of a surface of a first electrode of the light emitting element exposed by the pixel defining layer.

The opening ratio of the pixel PX may influence an amount of electron-hole recombination in a light emitting layer inside the light emitting element and a current density flowing through the light emitting element. For example, the current density may decrease according to an increase in the opening ratio of the pixel PX, and a rate of age reduction of the pixel PX may decrease due to the decrease in the current density.

FIG. 4 shows an age curve AGE1 corresponding to a reference opening ratio. The reference opening ratio may be a value, e.g., a nominal or target value, set for a display panel fabrication process. When the opening ratio of the pixel PX is greater than the reference opening ratio due to a process variation, the age reduction speed may be decreased (i.e., as indicated by an age curve AGE2) since the current density decreases as the sectional area of the light emitting element increases. That is, a slope of the age curve AGE2 may become gentle. In contrast, when the opening ratio of the pixel PX is smaller than the reference opening ratio due to process variation, the age reduction speed may be increased (i.e., as indicated by an age curve AGE3). That is, the slope of the age curve AGE3 may become steep.

Depending on the opening ratio of a pixel PX, the age of the pixel PX may increasingly deviate from the age curve AGE1 with the lapse of time. The display device 100 in accordance with the embodiments of the disclosure may have the degradation compensator 200 additionally apply, to the compensation data CDATA, a compensation factor obtained based on an opening ratio deviation. Thus, deviations between calculated ages of the pixels PX due to the opening ratio deviation can be reduced or minimized, and age curves for the pixels PX can be corrected.

Transmittance of the pixels PX may vary according to the thickness or thicknesses of the color filter in the pixels PX. In an example, the transmittance of a color filter may be higher when the thickness of the color filter is smaller than a reference thickness. In an example, when the thickness of the color filter is smaller than the reference thickness, the current density of the pixel PX to produce the desired light intensity may be decreased, and the age reduction speed according to the time lapse of the pixel PX may be decreased due to the decrease in the current density. Accordingly, the degradation compensator 200 may correct for the thickness of the color filter being smaller than the reference thickness, in the same manner as when correcting for the opening ratio being greater than the reference opening ratio.

The thickness of the color filter may vary in the first pixel area PA1 and the second pixel area PA2. In an example, the color filter in the first pixel area PA1 may have a thin (or narrow) thickness as compared with the color filter in the second pixel area PA2. The display device 100 in accordance with an embodiment of the present disclosure may have the degradation compensator 200 additionally apply, to the compensation data CDATA, a compensation factor obtained based on the thickness of the color filter.

In an example, when the thickness of the color filter of the second pixel area PA2 is set as a reference thickness, the compensation factor obtained for the thickness of the color filter may be applied to only compensation data CDATA corresponding to the first pixels PX1. Effects of deviation between the first pixel area PA1 (or the first pixels PX1) and the second pixel area PA2 (or the second pixels PX2) due to a color filter thickness deviation can be reduced or minimized.

Figure 5:
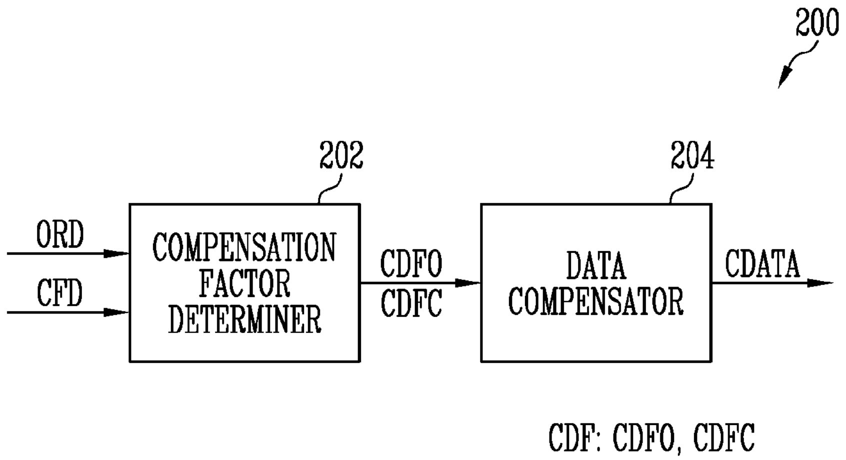
FIG. 5 is a block diagram illustrating a degradation compensator in accordance with an embodiment of the present disclosure.

FIG. 5 is a block diagram illustrating a degradation compensator in accordance with an embodiment of the present disclosure.

Referring to FIG. 5, the degradation compensator 200 may include a compensation factor determiner 202 and a data compensator 204.

The compensation factor determiner 202 may determine an opening compensation factor CDFO, based on an opening ratio ORD of the pixels PX. The compensation factor determiner 202 may determine a color filter compensation factor CDFC, based on a thickness CFD of the color filter for the pixels PX. The opening ratio compensation factor CDFO may be used for compensation of the first pixels PX1 and the second pixels PX2. The color filter compensation factor CDFC may be used for compensation of the first pixels PX1. A compensation factor CDF, which may combine the opening ratio factor CDFO and the color filter compensation factor CDFC, may be a compensation value for improving the distribution of the age curves shown in FIG. 4.

In an embodiment, opening ratio ORD data may be measured for each of the pixels PX (or sub-pixels) as part of a manufacturing process. In an embodiment, the opening ratio ORD data may be calculated based on a distance between sub-pixels adjacent to each other. When the opening ratio ORD is substantially equal to the reference opening ratio (or when the opening ratio ORD is within a predetermined error range), the opening ratio compensation factor CDFO may be set to 1. When the opening ration ORD is smaller than the reference opening ratio, the opening compensation factor CDFO may be set to a value smaller than 1. In addition, when the opening ration ORD is greater than the reference opening ratio, the opening ratio compensation factor CDFO may be set to a value greater than 1. In an embodiment, the compensation factor determiner 202 may determine the opening compensation factor CDFO, using a lookup table or a function, in which a relationship between the opening ratio ORD and the opening ratio compensation factor CDFO is set.

In an embodiment, the thickness CFD of the color filter may be measured in the fabrication process. When the thickness CFD of the color filter is a reference thickness, the color filter compensation factor CDFC may be set to 1. In an example, a thickness CFD of the color filter of the second pixel area PA2 may be set as the reference thickness. Any separate compensation factor corresponding to the thickness CFD of the color filter may not be applied to the second pixels PX2 located in the second pixel area PA2.

The thickness CFD of the color filter in the first pixel area PA1 may thinner than the thickness of the color filter in the second pixel area PA2, and the color filter compensation factor CDFC may be set to a value greater than 1, corresponding to the thickness CFD of the color filter of the first pixel area PA1. In an embodiment, the thickness CFD of the color filter may be applied to each of the sub-pixels. In an embodiment, the first pixel PX1 may include first sub-pixels emitting light of a first color, second sub-pixels emitting light of a second color, and third sub-pixels emitting light of a third color. The thickness CFD of the color filter may be differently set with respect to the first sub-pixels, the second sub-pixels, and the third sub-pixels, and accordingly, the color filter compensation factor CDFC may be differently applied to each of the sub-pixels.

In an embodiment, the compensation factor determiner 202 may determine the color filter compensation factor CDFC, using a lookup table or a function in which a relationship between the thickness CFD of the color filter and the color filter compensation factor CDFC is set.

In the case of the second pixels PX2, the data compensator 204 may generate compensation data CDATA (or second compensation data) for compensating for image data by applying the opening ratio compensation factor CDFO to a stress compensation weighted value. In the case of the first pixels PX1, the data compensator 204 may generate compensation data CDATA (or first compensation data) for compensating for image data by applying the opening ratio compensation factor CDFO and the color filter compensation factor CDFC to the stress compensation weighted value. The stress compensation weighted value may be calculated according to a stress value extracted from accumulated input data Din (or accumulated output data Dout). The stress value may include information of an emission time, a grayscale (or luminance), and the like.

As described above, the degradation compensator 200 in accordance with the embodiment of the present disclosure generates the compensation data CDATA, using the opening ratio compensation factor CDFO for compensating for an opening ratio ORD deviation and the color filter compensation factor CDFC for compensating for a thickness CFD deviation of the color filter, so that the age curve of the pixels PX can be shifted to the target age curve. Thus, the distribution of age curves can be uniformly improved.

Figure 6A:
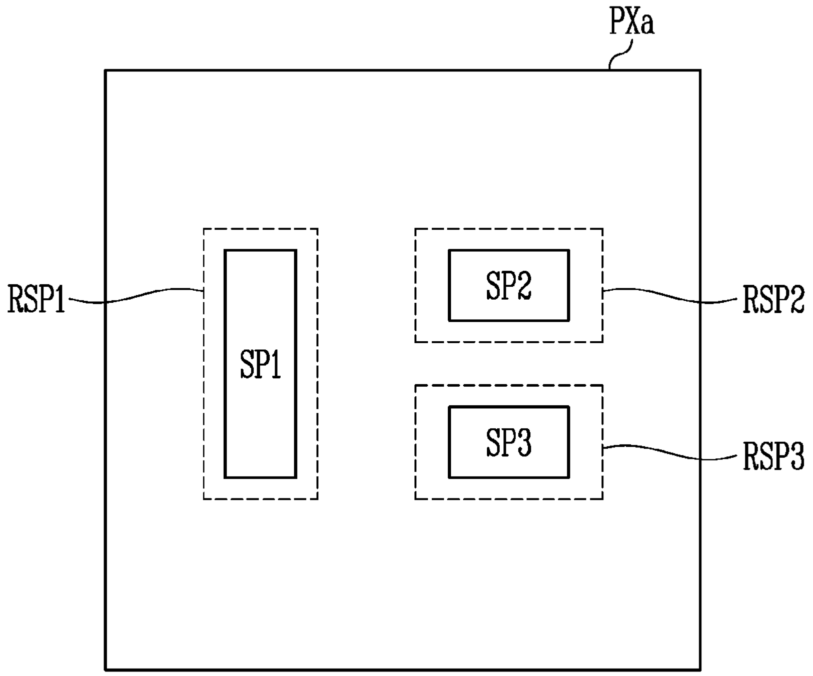
FIGS. 6A and 6B show example pixels for which an opening ratios may be calculated.
Figure 6B:
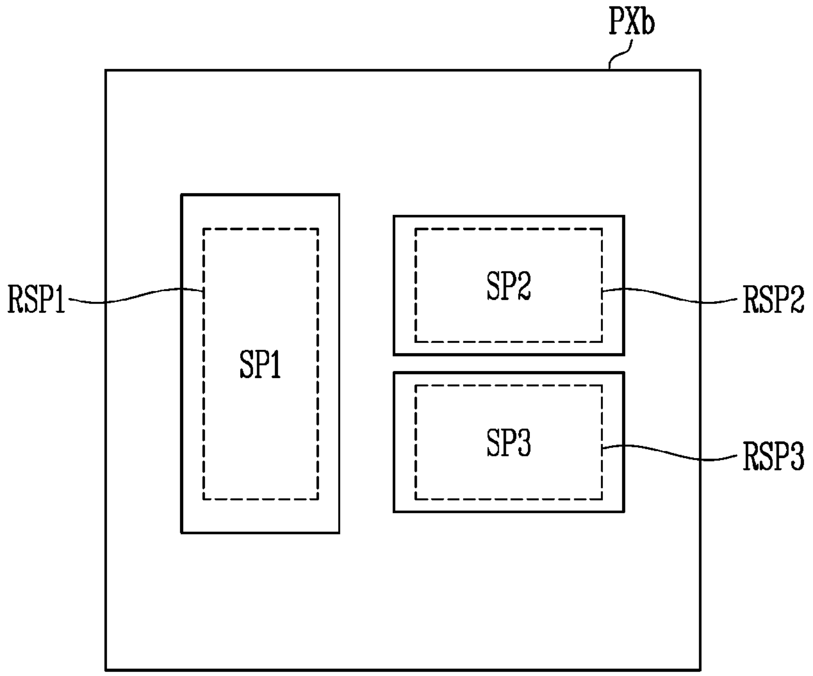
Figure 7:
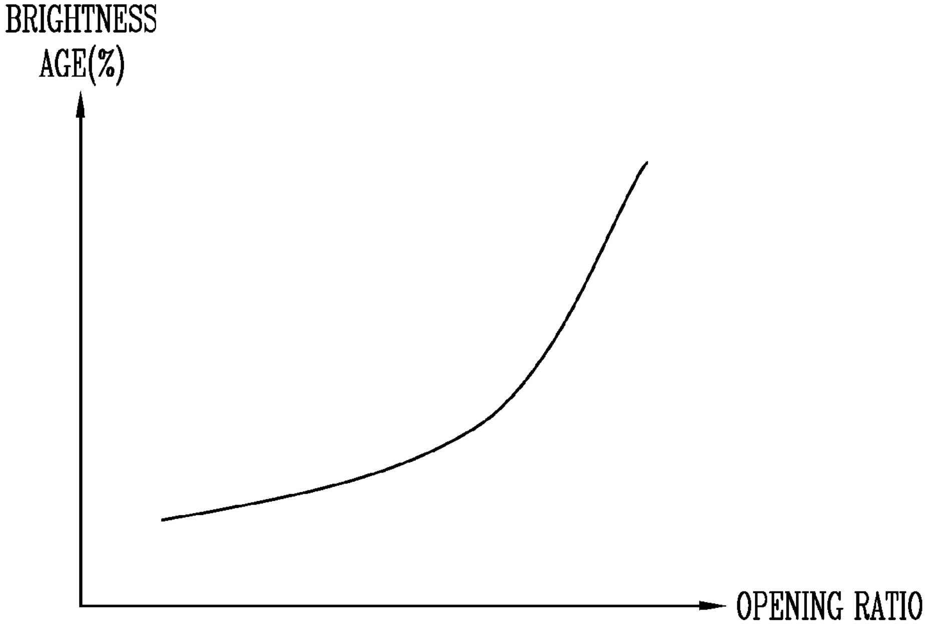
FIG. 7 is a graph illustrating an example of a relationship between an opening ratio and an age of a pixel.

FIGS. 6A and 6B illustrate examples in which opening ratios may be calculated. FIG. 7 is a graph illustrating an example of a relationship between an opening ratio and an age of a pixel. Each of the pixels PXa and PXb shown in FIGS. 6A and 6B may be any one of the first pixel PX1 and the second pixel PX2.

Referring to FIGS. 6A and 6B, an opening ratio ORD of the pixels PXa or PXb may be different from the reference opening ratio due to a process deviation.

Each of the pixels PXa and PXb may include a first sub-pixel SP1, a second sub-pixel SP2, and a third sub-pixel SP3. For example, each of the first to third sub-pixels SP1 to SP3 may emit light of one of red, green, and blue. Each of areas of the first to third sub-pixels SP1 to SP3 may be an emission area of the sub-pixel. Each of the areas RSP1 to RSP2 may be a reference area for a corresponding one of the sub-pixels SP1 to SP3

As shown in FIG. 6A, a substantial opening ratio of the pixel PXa may be smaller than the reference opening ratio. That is, actual sub-pixels SP1 to SP3 of the pixel PXa may be smaller than reference sub-pixels RSP1, RSP2, and RSP3 corresponding to the reference opening ratio.

As shown in FIG. 6B, a substantial opening ratio of the pixel PXb may be greater than the reference opening ratio. That is, actual sub-pixels SP1 to SP3 of the pixel PXb may be larger than the sub-pixels RSP1, RSP2, and RSP3 corresponding to the reference opening ratio. The opening ratio ORD of the sub-pixels SP1 to SP3 may be measured in the manufacturing process.

FIG. 7 illustrates a relationship between an opening ration ORD of a pixel and a luminance or brightness age after used for a time. As the opening ratio ORD of the pixel increases, the luminance age may increase.

The degradation compensator 200 may generate the opening ratio compensation factor CDFO in a direction in which the luminance age is decreased when the opening ratio ORD is greater than the reference opening ratio and generate the opening ratio compensation factor CDFO in a direction in which the luminance age is increased when the opening ration ORD is smaller than the reference opening ratio. Thus, the age distribution (deviation) caused by the opening ratio ORD deviation can be improved.

Figure 8A:
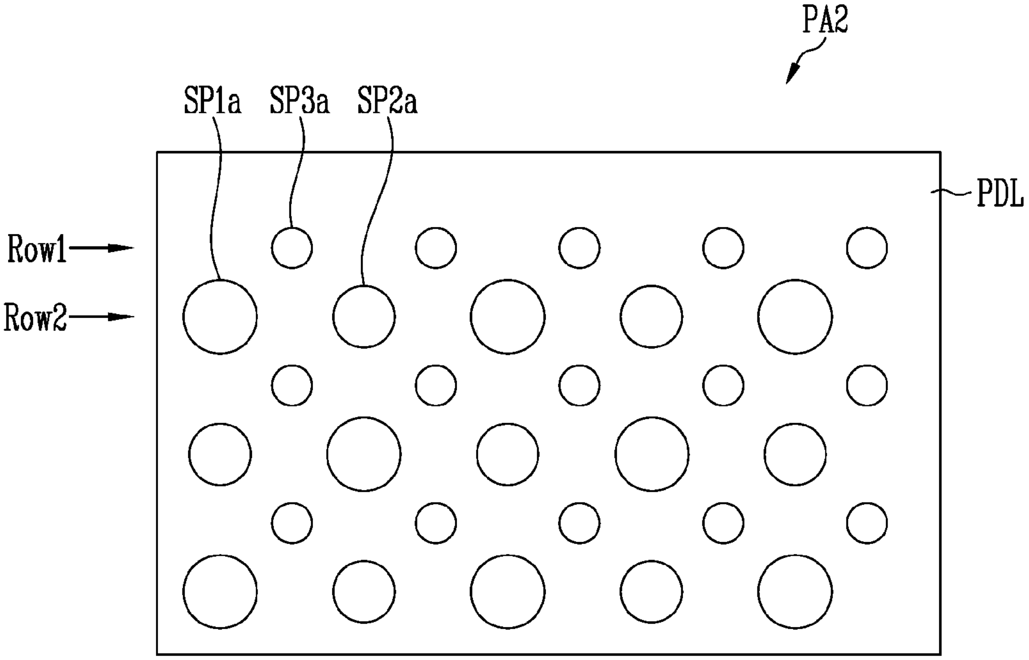
FIGS. 8A and 8B show second pixels disposed in a second pixel area.
Figure 8B:
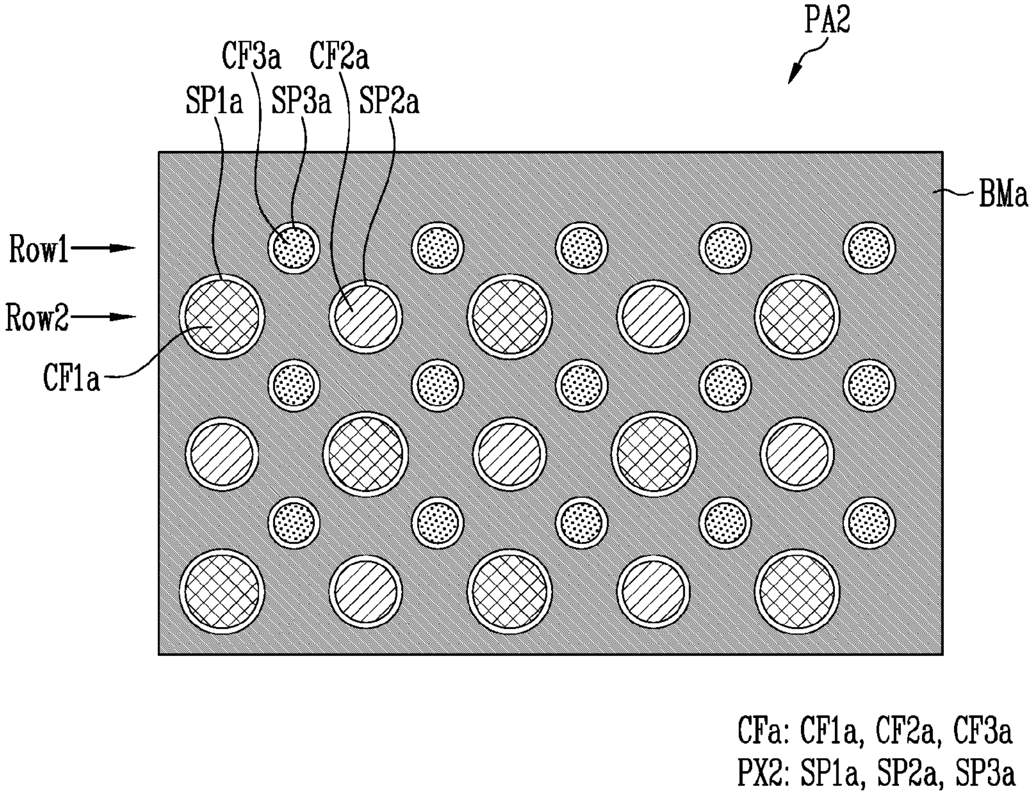

FIGS. 8A and 8B are plan views illustrating sub-pixels SP1*a*, SP2*a*, and SP3*a* of the second pixels disposed in the second pixel area PA2. In FIGS. 8A and 8B, an arrangement of the second pixels PX2 is merely illustrative, and the second pixels PX2 may be arranged in various manners currently known in the art.

Referring to FIG. 8A, each second pixel PX2 may include sub-pixels SP1*a*, SP2*a*, and SP3*a*, and the sub-pixels SP1*a*, SP2*a*, and SP3*a* may be disposed in an open area of a pixel defining layer PDL. The pattern of the open area of the pixel defining layer PDL may define a location and an opening ratio of each of the sub-pixels SP1*a*, SP2*a*, and SP3*a*. For example, a first row ROW1 may contain third sub-pixels SP3*a*, and a second row ROW2 may contain first and second sub-pixels SP1*a* and SP2*a*.

Referring to FIG. 8B, a light blocking layer BMa may be formed on the pixel defining layer PDL, and a color filter CFa may be formed to overlap with the sub-pixels SP1*a* to SP3*a*. The color filter CFa may include a first color filter CF1*a*, a second color filter CF2*a*, and a third color filter CF3*a*. The first color filter CF1*a* corresponding to a first color (e.g., blue) may be formed on the first sub-pixel SP1*a*, the second color filter CF2*a* corresponding to a second color (e.g., red) may be formed on the second sub-pixel SP2*a*, and a third color filter CF3*a* corresponding to the third color (e.g., green) may be formed on the third sub-pixel SP3*a*.

The light blocking layer BMa may be formed in the entire area of the second pixel area PA2 except on the sub-pixels SP1*a* to SP3*a* such that light from adjacent sub-pixels SP1*a* to SP3*a* is not mixed.

Figure 9A:
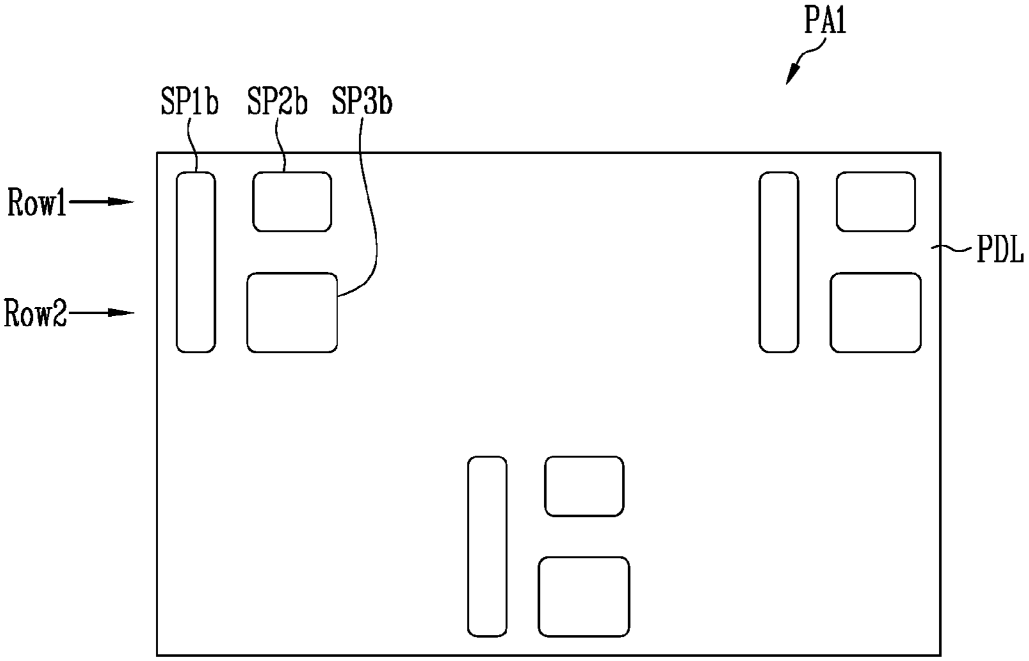
FIGS. 9A and 9B show first pixels disposed in a first pixel area.
Figure 9B:
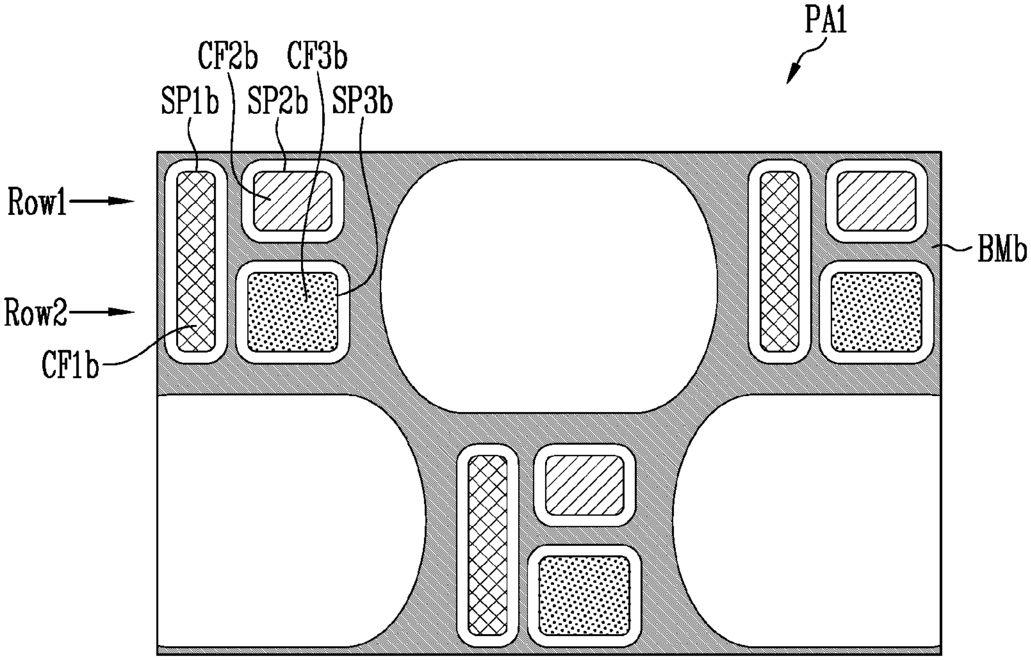

FIGS. 9A and 9B are plan views illustrating the first pixels PX1 disposed in the first pixel area PA1. In FIGS. 9A and 9B, an arrangement of the first pixels PX1 is merely illustrative, and the first pixels PX1 may be arranged in various methods currently known in the art.

Referring to FIG. 9A, each first pixel PX1 may include sub-pixels SP1*b*, SP2*b*, and SP3*b*. An arrangement of the sub-pixels SP1*b*, SP2*b*, and SP3*b* included in the first pixel PX1 may be different from the arrangement of the sub-pixels SP1*a* to SP3*a* included in the second pixel PX2.

In an example, a second sub-pixel SP2*b* may be disposed on a first row ROW1, and a third sub-pixel SP3*b* may be disposed on a second row ROW2. In addition, a first sub-pixel SP1 may be located on the first row ROW1 and the second row ROW2 to be adjacent to the second sub-pixel SP2*b* and the third sub-pixel SP3*b*. The sub-pixels SP1*b* to SP3*b* may be disposed in the open area of the pixel defining layer PDL.

In an embodiment, a number (density) of first pixels PX1 disposed per unit area may be smaller than a number (density) of second pixels PX2 disposed per unit area. Therefore, a resolution of the first pixel area PA1 may be lower than a resolution of the second pixel area PA2. Since the resolution of the first pixel area PA1 is lower than the resolution of the second pixel area PA2, a predetermined sensor (e.g., a camera, an optical sensor, and the like) may overlap the first pixel area PA1.

Referring to FIG. 9B, a light blocking layer BMb may be formed to partially overlap the pixel defining layer PDL. The light blocking layer BMb may only be formed in an area adjacent to the sub-pixels SP1*b* to SP3*b* such that the light blocking layer BMb has openings or provides a sufficient transmittance to the sensor disposed in the first pixel area PA1. A thickness (or width) of the light blocking layer BMb formed in the first pixel area PA1 may be thinner (narrower) than a thickness (or width) of the light blocking layer Bma formed in the second pixel area PA2.

A color filter CFb may be formed to overlap with the sub-pixels SP1*b* to SP3*b*. The color filter CFb may include a first color filter CF1*b*, a second color filter CF2*b*, and a third color filter CF3*b*. The first color filter CF1*b* corresponding to a first color (e.g., blue) may be formed on the first sub-pixel SP1*b*, the second color filter CF2*b* corresponding to a second color (e.g., red) may be formed on the second sub-pixel SP2*b*, and the third color filter CF3*b* corresponding to a third color (e.g., green) may be formed on the third sub-pixel SP3*b*.

The color filter CFb may be disposed to partially overlap with the light blocking layer BMb. Since the thickness of the light blocking layer BMb formed in the first pixel area PA1 is different from the thickness of the light blocking layer BMa formed in the second pixel area PA2, a thickness of the color filter CFb formed in the first pixel area PA1 may also be different from a thickness of the color filter CFa formed in the second pixel area PA2.

In an example, the first color filter CF1*b* may have a thickness thinner than a thickness of the first color filter CF1*a*. In an example, the second color filter CF2*b* may have a thickness thinner than a thickness of the second color filter CF2*a*. In an example, the third color filter CF3*b* may have a thickness thinner than a thickness of the third color filter CF3*a*.

When the color filter CFb is thin, the transmittance of the pixel PX high (and/or the current density needed for the pixel PX produce a desired luminance decreases), and hence a color filter compensation factor ODFC may be generated in a direction in which an age is decreased. The age distribution (deviation) caused by a color filter deviation can be improved.

Figure 10:
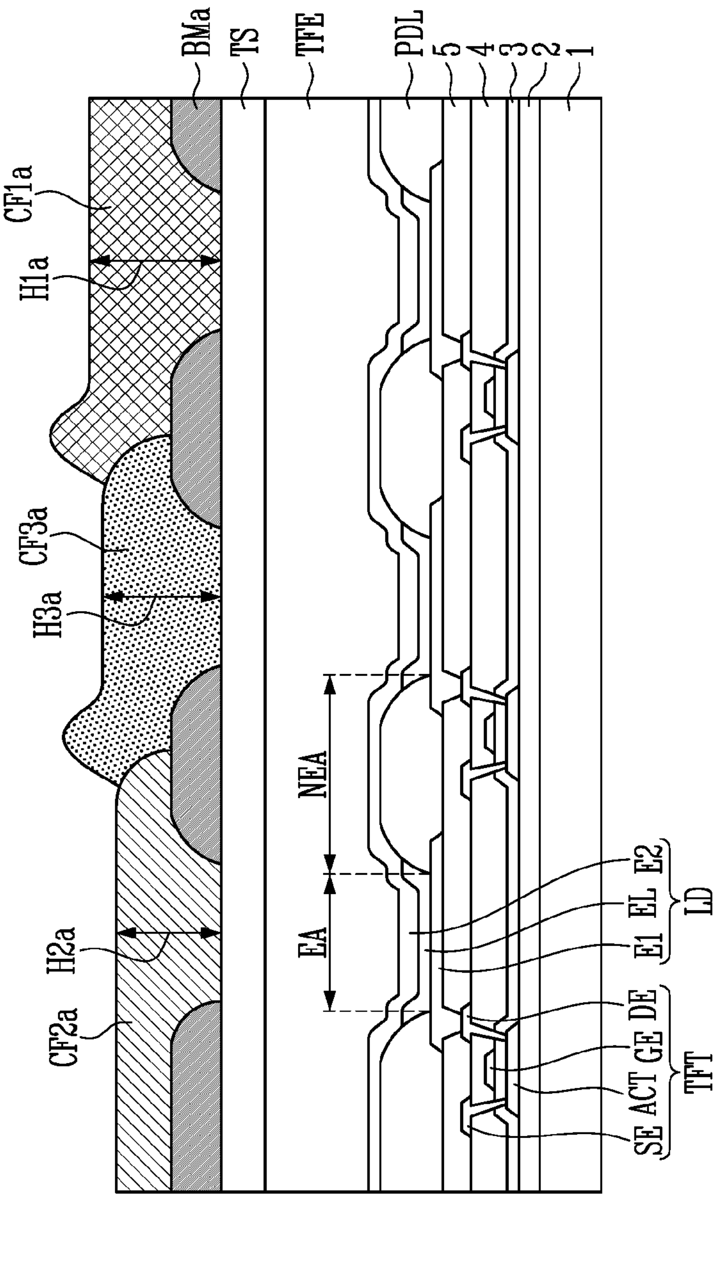
FIG. 10 schematically illustrates a section of the second pixel shown in FIG. 8B.

FIG. 10 is a schematic cross-sectional view of the second pixel PX2 shown in FIG. 8B.

The second pixel PX2 may be located in the second pixel area of the display device 100 and may include the sub-pixels SP1*a*, SP2*a*, and SP3*a* as described above. Referring to FIG. 10, each of the sub-pixels SP1*a*, SP2*a*, and SP3*a* may be divided into an emission area EA and a peripheral area NEA.

The display device 100 may include a substrate 1, a lower structure including at least one transistor TFT for driving of the sub-pixels SP1*a*, SP2*a*, and SP3*a*, a light emitting structure, a touch sensor TS, and a color filter CFa.

The substrate 1 may be a rigid substrate or a flexible substrate. The rigid substrate may include a glass substrate, a quartz substrate, a glass ceramic substrate, and a crystalline glass substrate. The flexible substrate may include a film substrate and a plastic substrate, including a polymer organic material.

A buffer layer 2 may be disposed on the substrate 1. The buffer layer 2 may prevent an impurity from diffusing into the transistor TFT. The buffer layer 2 may be provided as a single layer or as a multi-layer structure including at least two layers.

The lower structure, including the transistor TFT and a plurality of conductive lines, may be disposed on the buffer layer 2.

In an embodiment, an active pattern ACT may be disposed on the buffer layer 2. The active pattern ACT may be formed of a semiconductor material. For example, the active pattern ACT may include poly-silicon, amorphous silicon, an oxide semiconductor, and the like. A gate insulating layer 3 may be disposed on the buffer layer 2 and the active pattern ACT. The gate insulating layer 3 may be an inorganic insulating layer including an inorganic material.

A gate electrode GE may be disposed on the gate insulating layer 3, and a first insulating layer 4 may be disposed on the gate insulating layer 3 and the gate electrode GE. A source electrode SE and a drain electrode DE may be disposed on the first insulating layer 4. The source electrode SE and the drain electrode DE may penetrate the gate insulating layer 3 and the first insulating layer 4 to connect to the active pattern ACT.

A second insulating layer 5 may be disposed on the first insulating layer 4 on which the source electrode SE and the drain electrode DE are disposed. The second insulating layer 5 may be a planarization layer.

A light emitting element LD (or the light emitting structure) may include a first electrode E1, a light emitting layer EL, and a second electrode E2.

The first electrode E1 of the light emitting element LD may be disposed on the second insulating layer 5. In an embodiment, the first electrode E1 may be provided as an anode electrode of the light emitting element LD. The first electrode E1 may penetrate the second insulating layer 5 and connect to the drain electrode DE of the transistor TFT. The first electrode E1 may be patterned for each sub-pixel. The first electrode E1 may be disposed in a portion of the peripheral area NEA and the light emitting area EA on the second insulating layer 5.

The first electrode E1 may be formed using a metal, an alloy, a metal nitride, a conductive metal oxide, a transparent conductive material, and the like. These may be used alone or in combination.

A pixel defining layer PDL may be disposed in the peripheral area NEA on the second insulating layer 5. The pixel defining layer has an open area that exposes a portion of the first electrode E1. The pixel defining layer PDL may be made of an organic material or an inorganic material. That is, the emission area EA may be defined by the pixel defining layer PDL.

The light emitting layer EL may be disposed on the first electrode E1 exposed by the open area of the pixel defining layer PDL. The light emitting layer EL may also extend along a sidewall of the pixel defining layer PDL. In an embodiment, the light emitting layer EL may be formed using at least one light emitting material capable of emitting different colors of light (i.e., red light, green light, blue light, and the like) according to sub-pixels.

The second electrode E2 may be commonly disposed on the pixel defining layer PDL and the light emitting layer EL. In an embodiment, the second electrode E2 may be provided as a cathode electrode of the light emitting element LD. The second electrode E2 may be formed using a metal, an alloy, a metal nitride, a conductive metal oxide, a transparent conductive material, and the like. These may be used alone or in combination. Accordingly, the light emitting element LD including the first electrode E1, the light emitting layer EL, and the second electrode E2 may be formed.

An encapsulation layer TFE covering the second electrode E2 may be formed over the second electrode E2. The encapsulation layer TFE may include a plurality of insulating layers covering the light emitting element LD. For example, the encapsulation layer TFE may have a structure in which an inorganic layer and an organic layer are alternately stacked. In some cases, the encapsulation layer TFE may be an encapsulation substrate which is disposed over the light emitting element LD and is bonded to the substrate 1 through a sealant.

The touch sensor TS may be provided on the encapsulation layer TFE through a continuous process. The touch sensor TS may include a plurality of insulating layers and a plurality of conductive layers, which are not shown. The touch sensor TS may include first sensing electrodes and second sensing electrodes to sense an external input.

A light blocking layer Bma may be formed on the touch sensor TS to overlap with the peripheral area NEA (or non-emission area). When the light blocking layer Bma is formed between first, second, and third color filters CF1*a*, CF2*a*, and CF3*a*, a color mixture defect viewed at the front or side of the display device 100 can be prevented. The material of the light blocking layer Bma is not particularly limited, and the light blocking layer Bma may employ various light blocking materials.

The color filter CFa may be formed between the light blocking layers Bma to overlap with the emission area EA. The color filter CFa may include a color filter material for allowing light of a specific color to be selectively transmitted therethrough. The color filter CFa may include a red color filter, a green color filter, and a blue color filter.

In an example, when the first sub-pixel SP1*a* is a blue sub-pixel, the first color filter CF1*a* for allowing blue light to be transmitted therethrough may be disposed on the first sub-pixel SP1*a*. When the second sub-pixel SP2*a* is a red sub-pixel, the second color filter CF2*a* for allowing red light to be transmitted therethrough may be disposed on the second sub-pixel SP2*a*. When the third sub-pixel SP3*a* is a green sub-pixel, the third color filter CF3*a* for allowing green light to be transmitted therethrough may be disposed on the third sub-pixel SP3*a*.

Figure 11:
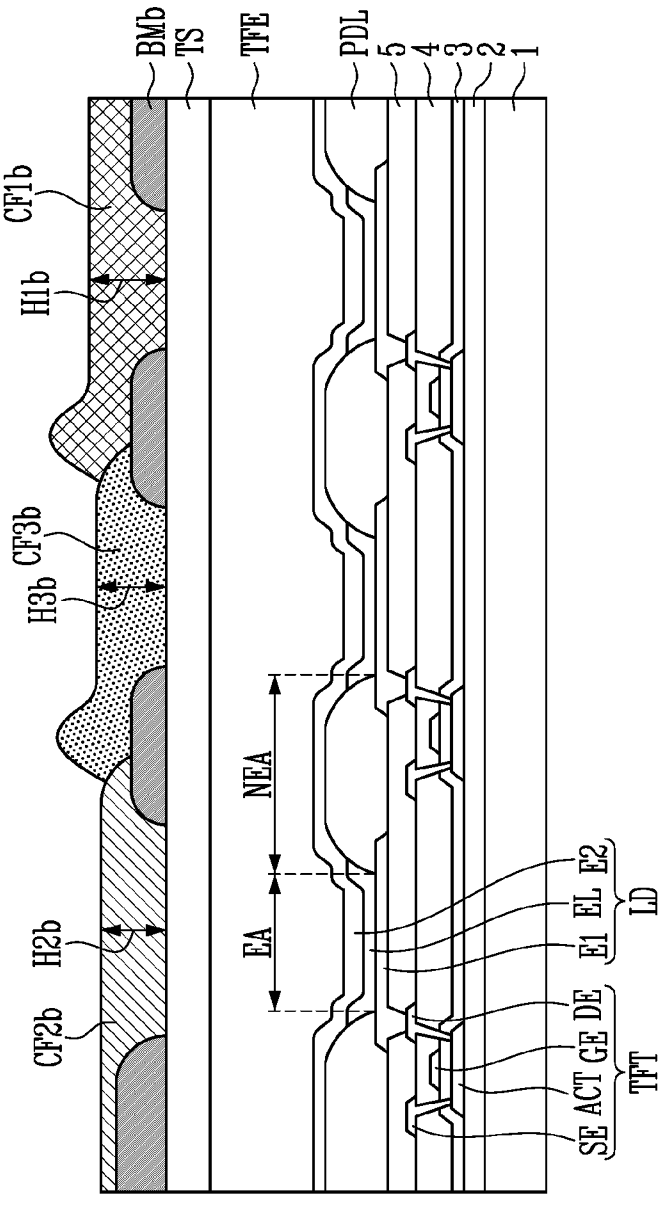
FIG. 11 schematically illustrates a section of the first pixel shown in FIG. 9B.

FIG. 11 is a schematic cross-sectional view of the first pixel shown in FIG. 9B. In FIG. 11, components overlapping with those shown in FIG. 10 are designated by like reference numerals, and repetitions of their detailed descriptions are omitted.

Referring to FIG. 11, a light blocking layer BMb may be formed on the touch sensor TS to overlap with the peripheral area NEA (or non-emission area) of the sub-pixels SP1*b* to SP3*b*. When the light blocking layer BMb is formed between first, second, third color filters CF1*b*, CF2*b*, and CF3*b*, a color mixture defect viewed at the front or side of the display device 100 can be prevented. The material of the light blocking layer BMb is not particularly limited, and the light blocking layer BMb may employ various light blocking materials.

The light blocking layer BMb may only be formed in an area adjacent to the sub-pixels SP1*b* to SP3*b* such that a sufficient transmittance may be provided to a sensor disposed in the first pixel area PA1. A thickness (or width) of the light blocking layer BMb formed in the first pixel area PA1 may be thinner (narrower) than a thickness (or width) of the light blocking layer BMa formed in the second pixel area PA2.

A color filter CFb may extend between regions of the light blocking layers BMb to overlap with the emission area EA. The color filter CFb may include a color filter material for allowing light of a specific color to be selectively transmitted therethrough. The color filter CFb may include a red color filter, a green color filter, and a blue color filter.

In an example, when the first sub-pixel SP1*b* is a blue sub-pixel, the first color filter CF1*b* for allowing blue light to be transmitted therethrough may be disposed on the first sub-pixel SP1*b*. When the second sub-pixel SP2*b* is a red sub-pixel, the second color filter CF2*b* for allowing red light to be transmitted therethrough may be disposed on the second sub-pixel SP2*b*. When the third sub-pixel SP3*b* is a green sub-pixel, the third color filter CF3*b* for allowing green light to be transmitted therethrough may be disposed on the third sub-pixel SP3*b*.

Since the thickness of the light blocking layer BMb formed in the first pixel area PA1 is different from the thickness of the light blocking layer BMa formed in the second pixel area PA2, a thickness of the color filter CFb formed in the first pixel area PA1 may also be different from a thickness of the color filter CFa formed in the second pixel area PA2.

In an example, when the first color filter CF1*a* is set to have a first thickness H1*a*, the first color filter CF1*b* may be set to have a first thickness H1*b* thinner than the first thickness H1*a*. When the second color filter CF2*a* is set to have a second thickness H2*a*, the second color filter CF2*b* may be set to have a second thickness H2*b* thinner than the second thickness H2*a*. When the third color filter CF3*a* is set to have a third thickness H3*a*, the third color filter CF3*b* may be set to have a third thickness H3*b* thinner than the third thickness H3*a*.

When the color filter is thin, its transmittance may be high, and therefore, the same effect as the opening ratio is large may be provided. In an example, when the color filter is thinner, the current density of the sub-pixels SP1*b*, SP2*b*, and SP3*b* needed to provide a desire luminance may be smaller. Thus, in the present disclosure, an afterimage (or degradation) may be reduced or prevented through use of a compensation factor that depends on the thickness of the color filter in the first pixel area PA1.

The thickness of the color filter may be measured in a manufacturing process. In an embodiment, the thickness of the color filter on the first pixel area PA1 may be uniform. In an example, when the thickness of each of the color filters CF1*b*, CF2*b*, and CF3*b* located in the first pixel area PA1 becomes thin at a constant ratio as compared with each of the color filters CF1*a*, CF2*a*, and CF3*a* located in the second pixel area PA2, one compensation factor corresponding to the thickness of the color filter may be used for the first pixels PX1.

In an embodiment, the thickness of the color filter may be different in the sub-pixels SP1*b* to SP3*b*. In an example, when the thickness of each of the color filters CF1*b*, CF2*b*, and CF3*b* located in the first pixel area PA1 becomes thin at a different ratio as compared with each of the color filters CF1*a*, CF2*a*, and CF3*a* located in the second pixel area PA2, separate compensation factors corresponding to the thicknesses of the color filter may be used for the sub-pixels SP1*b* to SP3*b*.

In an example, thicknesses of first color filters CF1*b* respectively corresponding to the first sub-pixels SP1*b* may be averaged, thereby reflecting the averaged thickness as a color filter thickness of the first sub-pixel SP1*b*. Thicknesses of second color filters CF2*b* respectively corresponding to the second sub-pixels SP2*b* may be averaged, thereby reflecting the averaged thickness as a color filter thickness of the second sub-pixel SP2*b*. Thicknesses of third color filters CF3*b* respectively corresponding to the third sub-pixels SP3*b* may be averaged, thereby reflecting the averaged thickness as a color filter thickness of the third sub-pixel SP3*b*.

Figure 12:
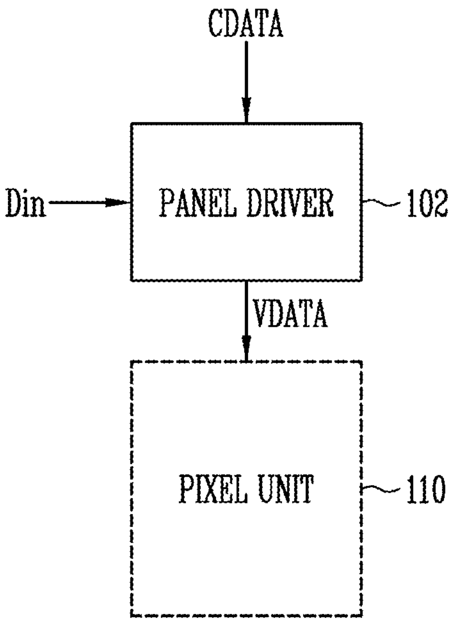
FIG. 12 shows an example of a panel driver that may be included in the display device shown in FIG. 3.

FIG. 12 is a block diagram illustrating an example of the display panel 110 and the panel driver 102 included in the display device 100 shown in FIG. 3.

Referring to FIGS. 3 and 12, the panel driver 102 may drive the pixel unit 110 with a data voltage VDATA generated using compensation data CDATA on input data Din. In an embodiment, the panel driver 102 may include the timing controller 120, the scan driver 130, and the data driver 140, which are shown in FIG. 3.

TA magnitude of the data voltage VDATA (or data signal) corresponding to the input data Din may differ according to an opening ratio ORD and a color filter thickness CFD of a pixel driven by the data voltage VDATA. The panel driver 102 may apply the compensation data CDATA to the input data Din, thereby controlling the magnitude of the data voltage VDATA. The thickness CFD of the color filter may be used when data voltage VDATA corresponding to the first pixels PX1 is output and may not be used or needed when data voltage VDATA corresponding to the second pixels PX2 is output.

The input data Din and the compensation data CDATA may represent data in a digital form, and the panel driver 102 may convert the data in the digital form (e.g., the output data Dout shown in FIG. 3) into a data voltage VDATA in an analog form. For example, the data driver 140 included in the panel driver 120 may provide the data voltage VDATA to the pixel unit 110 through the data lines DL1 to DLm.

With respect to the same input data Din (e.g., data representing the same grayscale illumination) provided to the panel driver 102, the data voltage VDATA may vary according to the opening ratio ORD and/or the thickness CFD of the color filter. Compensation of the data voltage VDATA may be based on the opening ratio compensation factor CDFO and the color filter compensation factor CDFC, which the degradation compensator 200 generates. For example, as the opening ration ORD increases corresponding or as the thickness CFD of the color filter decreases, the magnitude of the data voltage VDATA corresponding to the same input data Din may be controlled such that a driving current of the pixel is increased.

As described above, when the opening ratio ORD is greater than the reference or when the thickness CFD of the color filter is thin, the driving current of the pixel may be increased for the same input data Din. Age curves can be shifted to a desired age curve direction (e.g., an age curve corresponding to the reference opening ratio), and the distribution of the age curves can be improved.

In an embodiment, when the opening ratio is smaller than a predetermined reference opening ratio, a driving current of the pixel, which is caused by compensated data voltage VDATA corresponding to the input data Din, may be smaller than a driving current of the pixel, which is caused by a data voltage before compensation. That is, when the opening ratio ORD is smaller than the predetermined reference opening ratio, a luminance of the pixel, which is caused by the compensated data voltage VDATA corresponding to the input data Din, may be smaller than a luminance of the pixel, which is caused by the data voltage before compensation.

Figure 13:
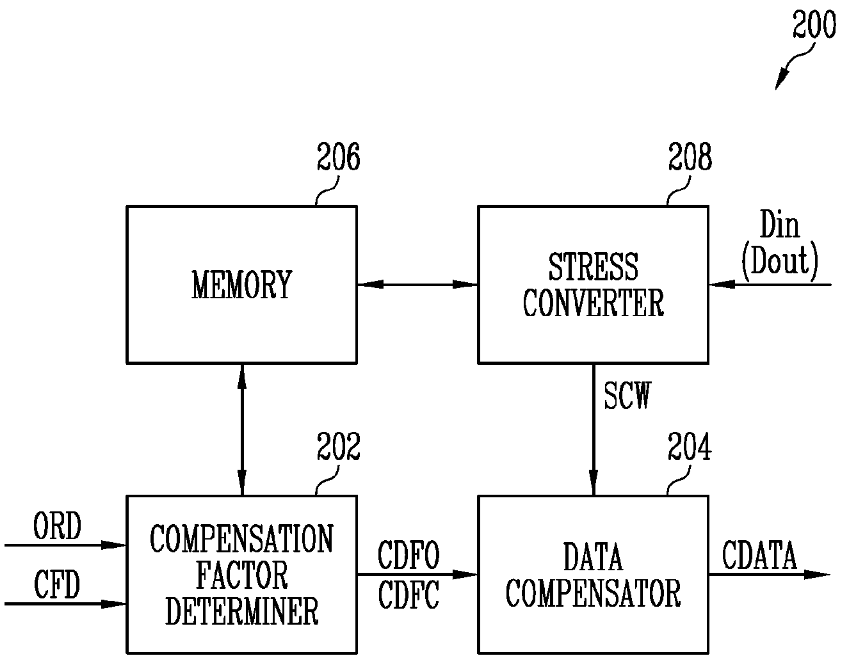
FIG. 13 shows an embodiment of a degradation compensator of FIG. 3.

FIG. 13 is a block diagram illustrating an embodiment of the degradation compensator shown in FIG. 3. In FIG. 13, components identical to those shown in FIG. 5 are designated by like reference numerals, and overlapping descriptions are omitted.

Referring to FIG. 13, the degradation compensator 200 may include a compensation factor determiner 202, a data compensator 204, a memory 206, and a stress converter 208.

The degradation compensator 200 may generate a stress compensation weighted value SCW by accumulating image data Din (or Dout) and may generate compensation data CDATA based on the stress compensation weighted value SCW.

The compensation factor determiner 202 may determine an opening ratio compensation factor CDFO, based on an opening ratio ORD of the pixels PX. The compensation factor determiner 202 may determine a color filter compensation factor CDFC, based on a thickness CFD of the color filter of the first pixel PX1. The compensation factor determiner 202 may provide the opening ratio compensation factor CDFO and the color filter compensation factor CDFC to the data compensator 204.

The stress converter 208 may calculate a stress value, based on input data Din (and/or output data Dout) corresponding to each of the sub-pixels SP1*a* to SP3*a* and SP1*b* to SP3*b*. A luminance drop (or residual age) according to accumulation of the input data Din (and/or the output data Dout) may be calculated as the stress value. The stress value may be determined based on information on a luminance, an emission time, and the like according to the accumulation of the input data Din (and/or the output data Dout). In an example, as the emission time is accumulated, the stress value may increase. The stress converter 208 may calculate the stress compensation weighted value SCW according to the stress value.

The stress converter 208 may store a stress value accumulated for each frame in the memory 206 and may update the stress value by receiving the accumulated stress value from the memory 206. Alternatively, the memory 206 may store the stress compensation weighted value SCW, and the stress converter 208 may transmit/receive the stress compensation weighted value to/from the memory 206.

In an embodiment, the memory 206 may store information on the opening ratio ORD and the thickness CFD of the color filter. The compensation factor determiner 202 may calculate the opening ratio compensation factor CDFO and the color filter compensation factor CDFC by receiving the opening ratio ORD and the thickness CFD of the color filter from the memory 206. Additionally, the opening ratio compensation factor CDFO and the color filter compensation factor CDFC may be stored in the memory 206. The compensation factor determiner 202 may receive the opening ratio compensation factor CDFO and the color filter compensation factor CDFC from the memory 206.

The data compensator 204 may apply an opening ratio compensation factor CDF corresponding to each of the second pixels PX2 (or the sub-pixels SP1*a* to SP3*a*) to a stress compensation weighted value SCW corresponding to each of the second pixels PX2, thereby generating compensation data CDATA corresponding to each of the second pixels PX2. For example, the data compensator 204 may generate the compensation data CDATA by multiplying the stress compensation weighted value SCW by the opening ratio compensation factor CDFO.

The data compensator 204 may apply an opening ratio compensation factor CDFO and a color filter compensation factor CDFC, which correspond to each of the first pixels PX1 (or the sub-pixels SP1*b* to SP3*b*), to a stress compensation weighted value SCW corresponding to each of the first pixels PX1, thereby generating compensation data CDATA corresponding to the first pixels PX1. For example, the data compensator 204 may generate the compensation data CDATA by multiplying the stress compensation weighted value SCW by the opening ratio compensation factor CDFO and the color filter compensation factor CDFC.

As described above, in an embodiment of the present disclosure, the opening ratio compensation factor CDFO may be used to determine the compensation data CDATA. A current density deviation caused by a difference in opening ratio between the pixels PX can be reduced or minimized, and the distribution of age curves can be uniformly improved.

As described above, in an embodiment of the present disclosure, a color filter compensation factor CDFC corresponding to the thickness of the color filter of the first pixel area PA1 may be used to determine the compensation data CDATA. A current density deviation between the first pixels PX1 and the second pixels PX2, which is caused by a difference in the thickness of the color filter, can be reduced or minimized, and the distribution of age curves can be uniformly improved.

An age predictive modeling corresponding to the second pixels PX2 may be expressed as shown in Equation 1.

$$B = \exp\left(S\left(th\left(\left(\frac{i}{istd}\right)Pm\right)^{ACC}\right)^{\frac{1}{T}}\right) \quad \text{Equation 1}$$

In Equation 1, B may denote a luminance change (or age) with respect to time, S may denote a light emitting element age modeling_slope coefficient, T may denote a light emitting element age modeling_time coefficient, th may denote a use time, ACC may denote a current density acceleration coefficient, Pm may denote a current density ratio corresponding to an opening ratio, i may denote a pixel current corresponding to stress accumulation, and istd may denote a reference current density corresponding to S and T.

In Equation 1, S, T, and ACC may be predetermined from material characteristics of the light emitting element, and the like. In Equation 1, th may correspond to the use time, and i may correspond to an accumulated current value flowing through the pixel. Pm corresponds to the opening ratio and may be understood as a current density ratio that the opening ratio ORD identifies.

An age predictive modeling corresponding to the first pixels PX1 may be expressed as shown in Equation 2.

$$B = \exp\left(S\left(th\left(\left(\frac{i}{istd}\right)Pm \times Pu\right)^{ACC}\right)^{\frac{1}{T}}\right) \quad \text{Equation 2}$$

In Equation 2, Pu may denote a current density ratio corresponding to a thickness of the color filter. Pu corresponds to the thickness of the color filter and may be understood as a value that reflects or depends on the thickness CFD of the color filter. The other variables in Equation 2 are described above with reference to Equation 1.

As described above, in the embodiments of the present disclosure, an age characteristic is compensated by reflecting a thickness of the color filter with respect to the first pixels PX1, so that an age characteristic deviation of the first pixels PX1 and the second pixels PX2 can be minimized.

In the display device and the method of driving the same in accordance with the present disclosure, image data is compensated using different compensation factors in an area having a high resolution and an area having a low resolution, and accordingly, an age deviation can be reduced or minimized.

Also, in the display device and the method of driving the same in accordance with the present disclosure, image data is compensated based on an opening ratio of pixels and a thickness of a color filter, and accordingly, an age deviation can be reduced or minimized.

Example embodiments have been disclosed herein, and although specific terms are employed, they are used and are to be interpreted in a generic and descriptive sense only and not for the purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A display device comprising:

a pixel unit including first pixels disposed in a first pixel area and second pixels disposed in a second pixel area;

a degradation compensator connected to a timing controller and configured to generate a stress compensation weighted value by accumulating image data, generate first compensation data corresponding to the first pixels, based on the stress compensation weighted value and a first compensation factor, and generate second compensation data, based on the stress compensation weighted value and a second compensation factor; and a panel driver including the timing controller and configured to drive the pixel unit by reflecting the first compensation data and the second compensation data on input data from an outside, wherein the first compensation factor used in generating the first compensation data corresponding to the first pixels includes a color filter thickness of the first pixel area.

2. The display device of claim 1, wherein a number of the first pixels disposed per unit area is smaller than a number of the second pixels disposed per unit area.

3. The display device of claim 2, wherein the first compensation factor depends on an opening ratio of first pixels and the color filter thickness of the first pixel area.

4. The display device of claim 3, wherein the color filter thickness is commonly applied to the first pixels.

5. The display device of claim 3, wherein each of the first pixels includes a first sub-pixel and a second sub-pixel displaying a color different from a color of the first sub-pixel, and different color filter thicknesses are applied to the first sub-pixel and the second sub-pixel.

6. The display device of claim 3, wherein a driving current of the first pixel, which corresponds to the first compensation data, is greater than a driving current before the color filter thickness is reflected on the first compensation data.

7. The display device of claim 3, wherein, when the opening ratio of the first pixels is greater than a predetermined reference opening ratio, a driving current of the first pixel, which corresponds to the first compensation data, is greater than a driving current before the opening ratio is reflected on the first compensation data.

8. The display device of claim 3, wherein, when the opening ratio of the first pixels is smaller than a predetermined reference opening ratio, a driving current of the first pixel, which corresponds to the first compensation data, is smaller than a driving current before the opening ratio is reflected on the first compensation data.

9. The display device of claim 3, wherein the second compensation factor depends on an opening ratio of second pixels.

10. The display device of claim 9, wherein, when the opening ratio of the second pixels is greater than a predetermined reference opening ratio, a driving current of the second pixel, which corresponds to the second compensation data, is greater than a driving current before the opening ratio is reflected on the second compensation data.

11. The display device of claim 9, wherein, when the opening ratio of the second pixels is smaller than a predetermined reference opening ratio, a driving current of the second pixel, which corresponds to the second compensation data, is smaller than a driving current before the opening ratio is reflected on the second compensation data.

12. The display device of claim 9, wherein the degradation compensator includes:

a compensation factor determiner configured to determine an opening ratio compensation factor, based on the opening ratio of the first pixel and the opening ratio of the second pixel, and determine a color filter compensation factor, based on the color filter thickness of the first pixel area; and a data compensator configured to generate the first compensation data and the second compensation data, using the opening ratio compensation factor, the color filter compensation factor, and the stress compensation weighted value.

13. The display device of claim 12, wherein the degradation compensator further includes:

a stress converter configured to generate the stress compensation weighted value; and a memory configured to store the opening ratio of the first pixel, the opening ratio of the second pixel, and the color filter thickness of the first pixel area.

14. The display device of claim 2, wherein the panel driver includes:

a data driver configured to generate a data signal to be supplied to the first pixels and the second pixels, using the output data, wherein the timing controller configured to generate output data to be supplied to the first pixels by reflecting the first compensation data on input data to be supplied to the first pixels among the input data, and generate output data to be supplied to the second pixels by reflecting the second compensation data on input data to be supplied to the second pixels among the input data.

15. The display device of claim 14, wherein the image data is at least one of the input data and the output data.

16. A method of driving a display device, the method comprising:

generating a stress compensation weighted value by accumulating image data;

generating first compensation data that depends on the stress compensation weighted value, an opening ratio of first pixels having a first resolution, and a color filter thickness of the first pixels;

generating second compensation data that depends on the stress compensation weighted value and an opening ratio of second pixels having a second resolution;

generating output data by altering, based on the first compensation data, first input data corresponding to the first pixel among input data supplied from an outside; and generating output data by altering, based on the second compensation data, second input data corresponding to the second pixel among the input data.

17. The method of claim 16, wherein a number of the first pixels disposed per unit area is smaller than a number of the second pixels disposed per unit area.

18. The method of claim 16, wherein the color filter thickness is commonly applied to the first pixels.

19. The method of claim 16, wherein each of the first pixels includes a first sub-pixel and a second sub-pixel displaying a color different from a color of the first sub-pixel, and different color filter thicknesses are applied to the first sub-pixel and the second sub-pixel.

20. The method of claim 16, wherein the opening ratio of the first pixels, the opening ratio of the second pixels, and the color filter thickness of the first pixels are measured and stored in advance in a process of manufacturing the display device.

* * * * *